(12) United States Patent
Chari et al.

(10) Patent No.: US 10,482,265 B2
(45) Date of Patent: Nov. 19, 2019

(54) DATA-CENTRIC MONITORING OF COMPLIANCE OF DISTRIBUTED APPLICATIONS

(71) Applicant: International Business Machines Corporation, Armonk, NY (US)

(72) Inventors: Suresh N. Chari, Tarrytown, NY (US); Ted Habeck, Fishkill, NY (US); Ashish Kundu, New York, NY (US); Ian M. Molloy, Chappaqua, NY (US); Dimitrios Pendarakis, Westport, CT (US); Josyula R. Rao, Briarcliff Manor, NY (US); Marc P. Stoecklin, Bern (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/983,873

(22) Filed: Dec. 30, 2015

(65) Prior Publication Data

US 2017/0193239 A1   Jul. 6, 2017

(51) Int. Cl.
  *G06F 21/57*  (2013.01)
  *G06F 21/60*  (2013.01)
(52) U.S. Cl.
  CPC .......... *G06F 21/604* (2013.01); *G06F 21/577* (2013.01); *G06F 2221/034* (2013.01)
(58) Field of Classification Search
  None
  See application file for complete search history.

(56) References Cited

U.S. PATENT DOCUMENTS

| 6,233,578 | B1 * | 5/2001 | Machihara | G06F 17/30424 |
| 7,624,422 | B2 * | 11/2009 | Williams | H04L 12/2602 |
| | | | | 726/1 |
| 8,561,185 | B1 * | 10/2013 | Muthusrinivasan | |
| | | | | G06F 21/6245 |
| | | | | 705/51 |
| 9,032,533 | B2 | 5/2015 | Bennett et al. | |
| 2006/0191010 | A1 * | 8/2006 | Benjamin | G06F 21/552 |
| | | | | 726/23 |
| 2008/0262882 | A1 * | 10/2008 | Farrell | G06F 19/322 |
| | | | | 705/7.32 |
| 2010/0114628 | A1 * | 5/2010 | Adler | G06Q 30/018 |
| | | | | 705/7.11 |

(Continued)

*Primary Examiner* — Benjamin E Lanier
(74) *Attorney, Agent, or Firm* — Harrington & Smith

(57) ABSTRACT

Log(s) of IT events are accessed in a distributed system that includes a distributed application. The distributed system includes multiple data objects. The distributed application uses, processes, or otherwise accesses one or more of data objects. The IT events concern the distributed application and concern accesses by the distributed application to the data object(s). The IT events are correlated with a selected set of the data objects. Risks are estimated to the selected set of data objects based on the information technology events. Estimating risks uses at least ranks of compliance rules as these rules apply to the data objects in the system, and vulnerability scores of systems corresponding to the set of data objects and information technology events. Information is output that allows a user to determine the estimated risks for the selected set of data objects. Techniques for determining ranks of compliance rules are also disclosed.

16 Claims, 13 Drawing Sheets

(56) References Cited

U.S. PATENT DOCUMENTS

| | | | |
|---|---|---|---|
| 2011/0093792 A1* | 4/2011 | Frayman | G06Q 50/18 715/752 |
| 2011/0107434 A1* | 5/2011 | Chow | G06F 21/6245 726/28 |
| 2013/0179977 A1* | 7/2013 | Bhola | G06Q 50/01 726/25 |
| 2014/0137257 A1 | 5/2014 | Martinez et al. | |
| 2014/0165195 A1* | 6/2014 | Brdiczka | G06F 21/552 726/23 |
| 2014/0172495 A1 | 6/2014 | Schneck et al. | |
| 2015/0381649 A1* | 12/2015 | Schultz | H04L 63/1433 726/25 |
| 2016/0112284 A1* | 4/2016 | Pon | H04L 43/045 709/224 |

* cited by examiner

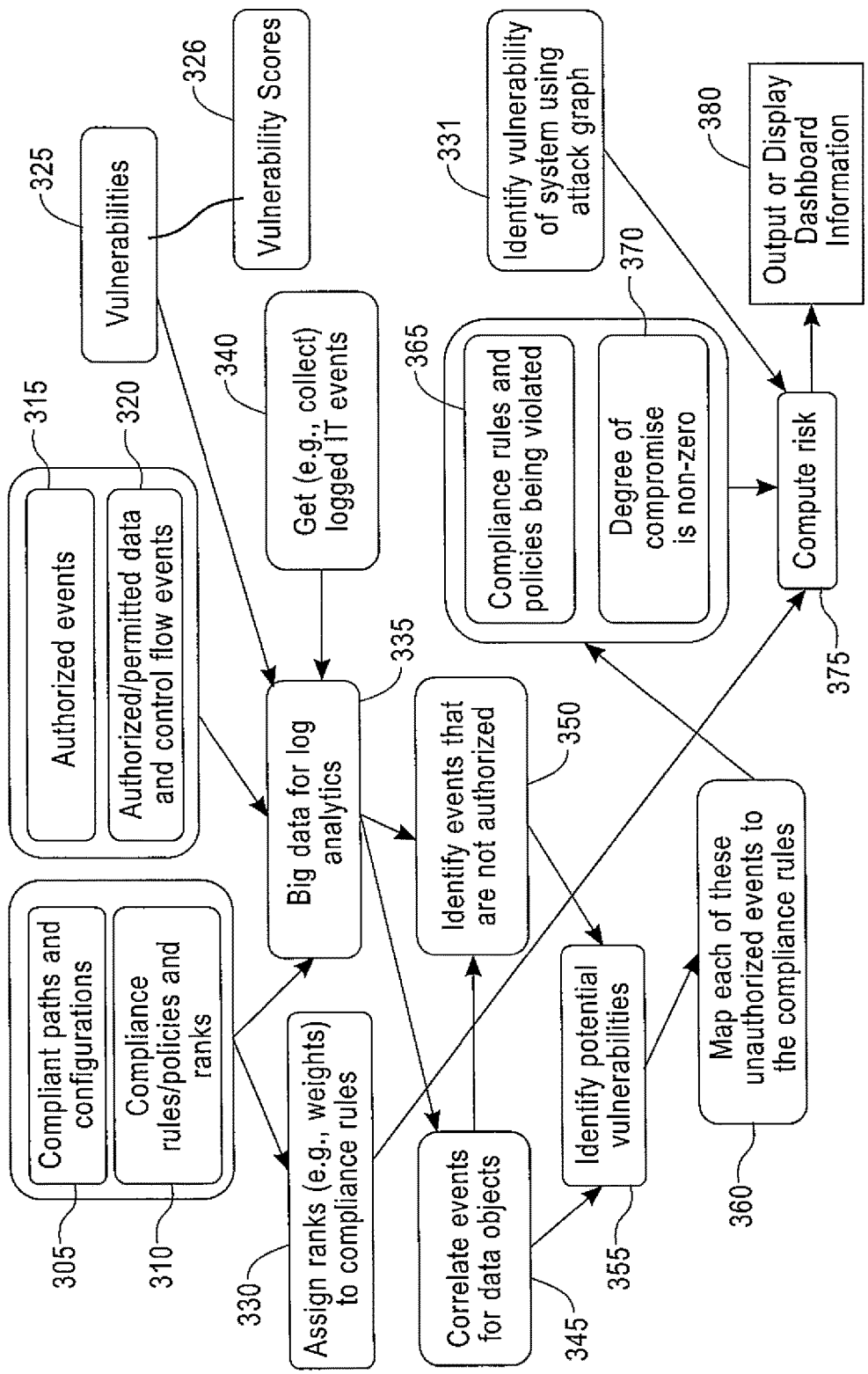
FIG. 4: FIG. 4A

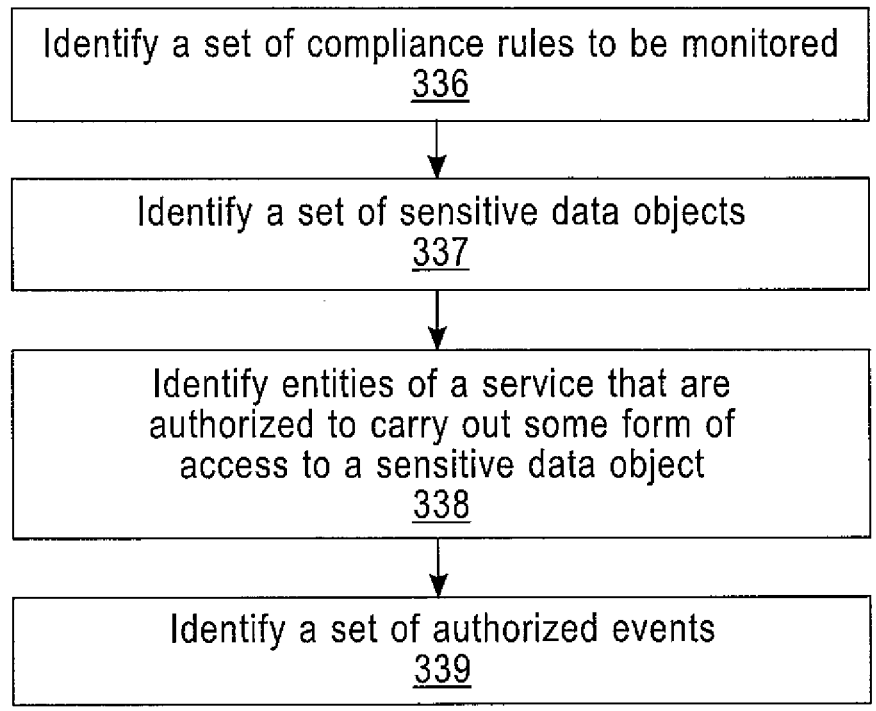
FIG. 4: FIG. 4B
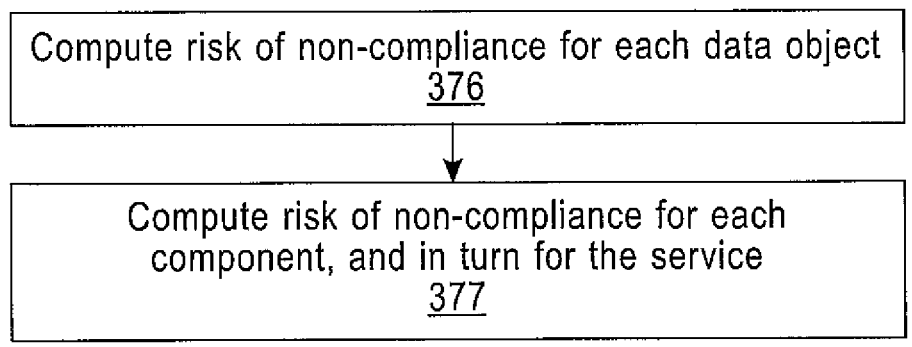
FIG. 4: FIG. 4C

DATA-CENTRIC MONITORING OF COMPLIANCE OF DISTRIBUTED APPLICATIONS

BACKGROUND

The present invention relates to networks, and more particularly to data-centric monitoring of compliance of applications.

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section. Abbreviations that may be found in the specification and/or the drawing figures are defined below, after the detailed description section.

Existing compliance monitoring systems focus on IT events. For instance, one common monitoring system is intrusion detection, which is the process of monitoring the events occurring in a computer system or network and analyzing them for signs of possible incidents, such as violations or imminent threats of violation of computer security policies, acceptable use policies, or standard security practices. Another example is log analysis for intrusion detection, which is the process used to detect attacks on a specific environment using logs as the primary source of information.

Meanwhile, regulatory compliance requirements focus on data protection and privacy. For instance, the Health Insurance Portability and Accountability Act (HIPAA) regulation impacts those in healthcare that exchange patient information electronically. HIPAA regulations were established to protect the integrity and security of health information, including protecting against unauthorized use or disclosure of the information. For HIPAA, a security management process must exist in order to protect against "attempted or successful unauthorized access, use, disclosure, modification, or interference with system operations".

Other laws and rules such as the Family Educational Rights and Privacy Act (FERPA) also require that information is to be protected for compliance requirements. These compliance requirements are currently being met by focusing on IT events.

For a distributed system, IT events (such as a privileged user login) on one component (e.g., holding keys) of the system may affect the protection of data on another component (e.g., holding encrypted data that can be decrypted using the keys) of the system. A system that focuses solely on IT events may not be able to capture such relationships, especially since the privileged user login might not be an IT event that would be considered an intrusion or other insecure network access and there may not be anything that links the login on one component to the data on another component.

SUMMARY

This section is intended to include examples and is not intended to be limiting.

An exemplary embodiment is a method for monitoring state of compliance of a distributed application in a data-centric manner. The method includes accessing, by a computer system, one or more logs of information technology events in a distributed system comprising the distributed application. The distributed system comprises a plurality of data objects, and the distributed application uses, processes, or otherwise accesses one or more of the plurality of the data objects. The information technology events concern the distributed application and concern accesses by the distributed application to one or more of the data objects. The method includes correlating, by the computer system, the information technology events with a selected set of the plurality of data objects. The method further estimating, by the computer system, risks to the selected set of data objects based on the information technology events. The estimating risks uses at least ranks of compliance rules as these rules apply to the data objects in the system and vulnerability scores of systems corresponding to the set of data objects and information technology events. The method includes outputting, by the computer system, information allowing a user to determine the estimated risks for the selected set of data objects.

In another exemplary embodiment, a computer system is disclosed for monitoring state of compliance of a distributed application in a data-centric manner. The computer system comprise one or more memories comprising computer-readable code and one or more processors. The computer system performs the following responsive to execution by the one or more processors of the computer-readable code: accessing one or more logs of information technology events in a distributed system comprising the distributed application, wherein the distributed system comprises a plurality of data objects, and the distributed application uses, processes, or otherwise accesses one or more of the plurality of the data objects, and wherein the information technology events concern the distributed application and concern accesses by the distributed application to one or more of the data objects; correlating the information technology events with a selected set of the plurality of data objects; estimating risks to the selected set of data objects based on the information technology events, wherein estimating risks uses at least ranks of compliance rules as these rules apply to the data objects in the system and vulnerability scores of systems corresponding to the set of data objects and information technology events; and outputting information allowing a user to determine the estimated risks for the selected set of data objects.

In yet another exemplary embodiment, a method is disclosed for determining ranks of compliance rules. The method includes the following: identifying dependencies between a plurality of compliance rules, wherein the compliance rules are defined by one or more regulations; representing the dependencies as a graph having nodes and edges, wherein each node represents a compliance rule or a group of compliance rules, and wherein each edge is a directed edge from a first node to another node such that the first node is dependent on the other node; traversing, by the computer system, the graph and computing rank of each node using one of a recurrence relation or dynamic programming; and outputting, by the computer system, the rank of each node, wherein each node is a rank of a compliance rule or a group of compliance rules.

BRIEF DESCRIPTION OF THE SEVERAL VIEWS OF THE DRAWINGS

FIG. 4, which includes FIGS. 4A, 4B, and 4C, is a logic flow diagram for data-centric monitoring of compliance of applications, and illustrates the operation of an exemplary method, a result of execution of computer program instructions embodied on a computer readable memory, functions performed by logic implemented in hardware, and/or interconnected means for performing functions in accordance with exemplary embodiments, where FIG. 4A illustrates an overall method for data-centric monitoring of compliance of applications, FIG. 4B illustrates an example of a method for big data for log analytics, and FIG. 4C illustrates an example of a method for computing risk;

DETAILED DESCRIPTION

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

As stated above, a system that focuses solely on IT events may not be able to capture relationships that nonetheless could impact security. To correct this, as described herein, methods, systems, and computer program products for data-centric compliance monitoring are disclosed. These bridge the gap between IT events and data protection as needed by regulatory compliance, and may be considered to be "big data" for compliance monitoring. The term "big data" refers to data sets that are so large or complex that traditional data processing applications are inadequate.

In brief, the techniques herein move from IT-centric monitoring to data-centric monitoring for, e.g., regulatory compliance. In an exemplary embodiment, IT events are translated from one or more components in a system to a risk associated with one or more associated sensitive data items. Consider the following example. A privileged user logs into a VM that is processing a genomic data item with a UUID of id1. This event contributes to an increase of the risk associated with the data item with the UUID of id1. This risk is a risk that the access might cause a breach of compliance regulations as well as may lead to data breaches.

In other exemplary embodiments, risks of each data item are estimated dynamically based on, e.g., distributed IT events, rank of regulatory compliance rules, sensitivity of data items, and component vulnerabilities. Such a system may then be a system for a data-centric monitoring dashboard using "big-data", as described in more detail below. More detailed description of exemplary techniques provided herein for data-centric monitoring of compliance of applications is provided after an introduction is provided to an exemplary system that might be used for such monitoring.

Figure 1:
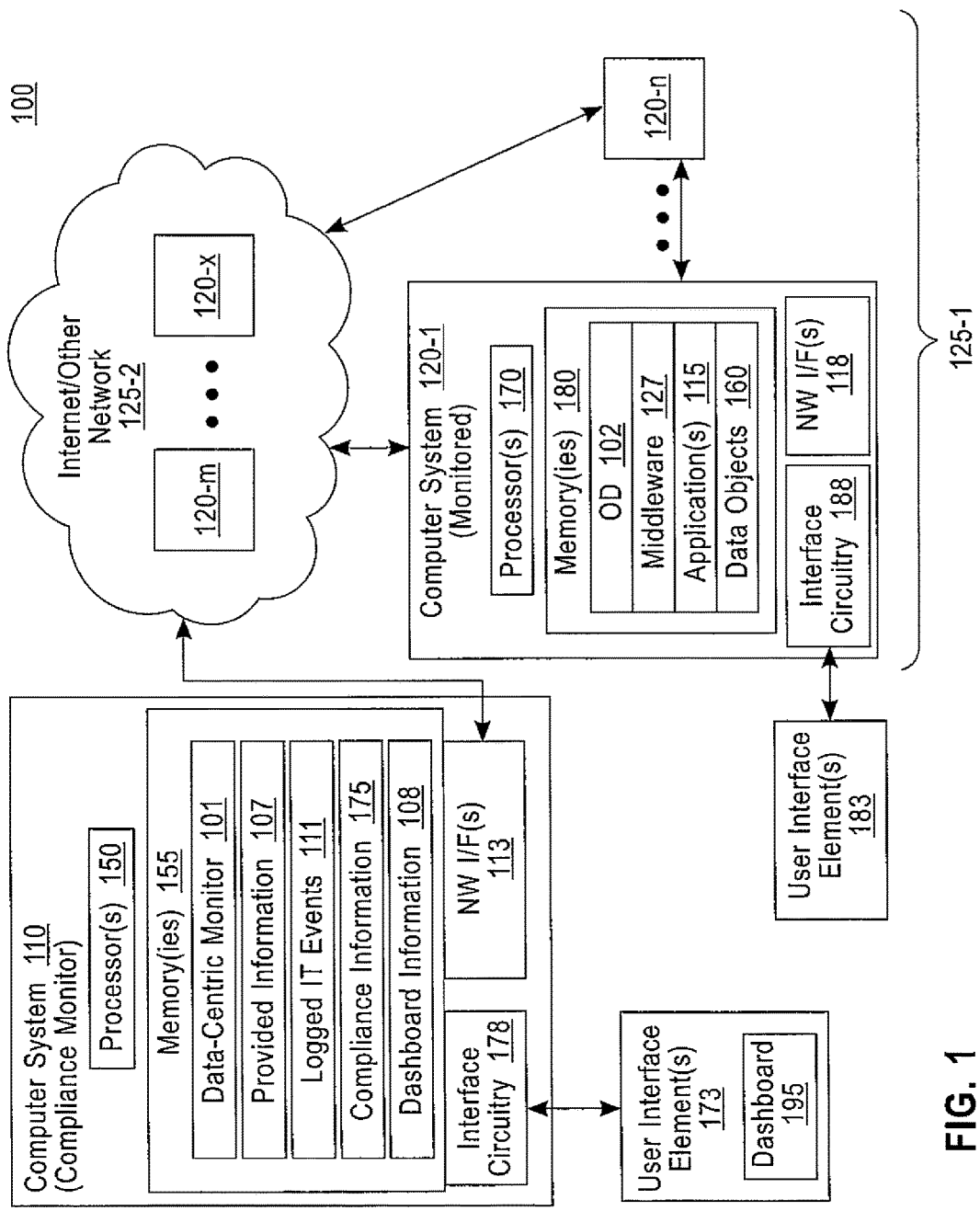
FIG. 1 illustrates an exemplary system used for data-centric monitoring of compliance of applications in an exemplary embodiment.

Turning now to FIG. 1, this figure illustrates an exemplary system 100 used for data-centric monitoring of compliance of applications in an exemplary embodiment. FIG. 1 illustrates one possible example and there are many others, such as systems with webservers, application servers, and cloud applications and servers. The system 100 comprises the computer systems 110 and 120-1 through 120-x, which communicates in part via the networks 125-1 and 125-2. The computer system 110 is a computer system that performs compliance monitoring in this example, and it should be noted that there could be multiple systems 110 performing such compliance monitoring. The computer systems 120 are the monitored computer systems. In this example, there is a network 125-1 of computer systems 120-1 through 120-n, and another network 125-2 of computer systems 120-m through 120-x. The letters n, m, and x have no meaning other than to distinguish separate systems. There could be one network 125 or multiple networks 125. For instance, the network 125-1 could be a local area network (LAN), while the network 125-2 could be a wide area network (WAN) or the Internet or the "cloud", e.g., and one or more of the computer systems 120-m through 120-x could be a webserver or a cloud-based server or an application server. The computer systems 120 could all be outside the Internet (as a network) 125, as another example, and communicate to other computer systems 120 solely via the Internet. Many other possibilities exist, too.

The computer system 110 comprises one or multiple processors 150, one or more multiple memories 155, interface circuitry 178, and one or more network (N/W) interfaces (I/F(s)) 113. The computer system 110 may include or be connected to one or more user interface elements 173. The one or more memories 155 comprise a data-centric monitor 101, provided information 107, logged IT events 111, compliance information 175, and dashboard information 108. The data-centric monitor 101 comprises functionality as described herein and comprises computer-readable code that, when executed by the one or more processors 150, cause the computer system 110 to perform the functionality described herein. The encryptor 101 may also be implemented (in part or completely) as hardware, such as being internal to the one or more processors 150.

In this example, a user (a human being, not shown) is using the computer system 110 and is viewing a dashboard 195, which allows the user to determine, e.g., risks associated with data objects. This is described in more detail below. The user interface elements 173 could therefore include a display upon which the dashboard 195 is shown. The dashboard information 108 includes information to allow the dashboard 195 to be presented to the user. It should be noted that the compliance monitoring computer system 110 could be a server or the like, and a user using a monitored computer system 120 (or other computer system) could access the compliance monitoring computer system 110 and show a dashboard on the monitored computer system 120 or other computer system.

For ease of reference, it is assumed all of the monitored computer systems 120 are similar, and a block diagram of the internals of only one monitored computer system 120 is shown in FIG. 1. The computer system 120 comprises one or multiple processors 170, one or more multiple memories 180, interface circuitry 188, and one or more network (N/W) interfaces (I/F(s)) 118. The computer system 120 may include or be connected to one or more user interface elements 183. The one or more memories 180 may comprise some or all of an OS 102, middleware 127, application(s) 115, and data objects 160. It should be noted that although these descriptions use the multiple version of the nouns, these may also be singular. The OS 102 is a collection of software that directs a computer's operations, controlling and scheduling the execution of other programs, and managing storage, input/output, and communication resources. Middleware 127 represents software that serves to connect separate, often complex and already existing, programs. The data objects 160 are the objects that can be tracked in terms of compliance. Applications 115 are applications that use, process, or otherwise access the data objects 160, and one example of these is described in reference to FIG. 2A.

The computer readable memories 155 and 180 may be of any type suitable to the local technical environment and may be implemented using any suitable data storage technology, such as semiconductor based memory devices, flash memory, magnetic memory devices and systems, optical memory devices and systems, fixed memory and removable memory, or some combination of these. The computer readable memories 155 and 180 may be means for performing storage functions. The processors 150 and 170 may be of any type suitable to the local technical environment, and may include one or more of general purpose processors, special purpose processors, microprocessors, gate arrays, programmable logic devices, digital signal processors (DSPs) and processors based on a multi-core processor architecture, or combinations of these, as non-limiting examples. The processors 150 and 170 may be means for performing functions, such as controlling the computer systems 110 and 120, respectively, and other functions as described herein.

The network interfaces 113 and 118 may be wired and/or wireless and communicate over the Internet/other network 125 via any communication technique. The insecure communication medium 105 may also be a wireless communication channel, or any other medium over which data can be communicated.

The user interface elements 173 and 183 may include, for instance, one or more of keyboards, mice, trackballs, displays (e.g., touch screen or non-touch screen), and the like. The computer systems 110 and 120 may be personal computer systems, laptops, and wireless devices such as smartphones and tablets.

Figure 2A:
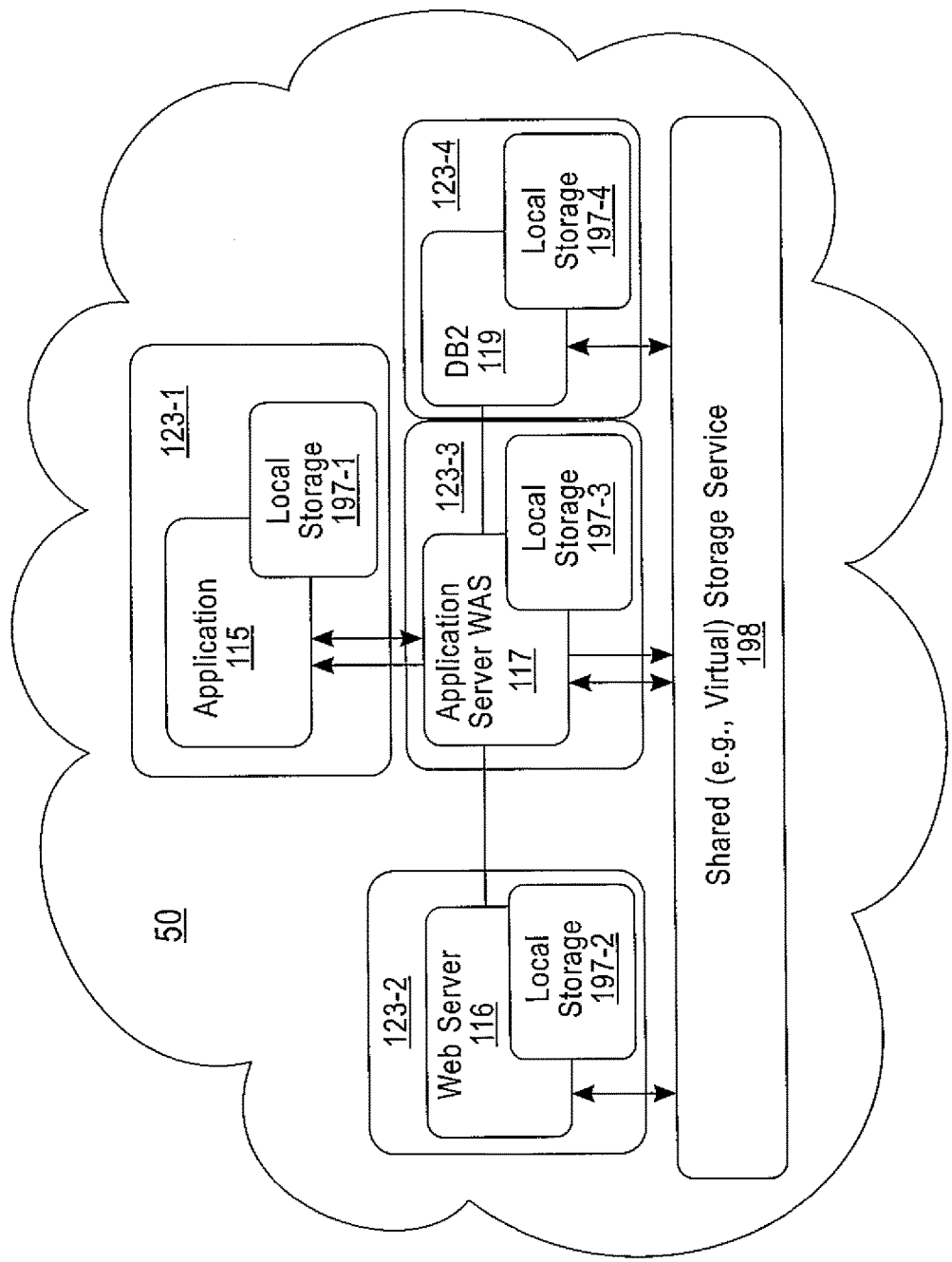
FIG. 2A illustrates an example of a multi-tier distributed application in accordance with an exemplary embodiment.

Turning to FIG. 2A, this figure illustrates an example of a multi-tier distributed application 115 in accordance with an exemplary embodiment. A distributed application 115 is an application that is executed or run on multiple computers within a network. These applications interact in order to achieve a specific goal or task. Traditional applications relied on a single system to run them. Even in the client-server model, the application software had to run on either the client, or the server that the client was accessing. However, distributed applications run on both simultaneously. With distributed applications, if a node that is running a particular application goes down, another node can resume the task. A distributed application also may be used in the client-server model when used simultaneously on a server and client computer. The front end of the operation runs on the client computer and requires minimal processing power, while the back end requires a lot more processing power and a more dedicated system and runs on a server computer.

FIG. 2A also shows a web server 116, an application server 117 such as a WebSphere Application Server (WAS), and a database 119 such as a DB2 database, each of which is located in the cloud 50. IBM DB2 is a family of database server products developed by IBM. Each component 115, 116, 117, and 119 may be running on a VM (virtual machine), container, or a stand-alone system. References 123-1, 123-2, 123-3, and 123-4 illustrate that each of the components 115, 116, 117, and 119 may be running on a VM (virtual machine), container, or a stand-alone system. VMs are guest systems running on a host system and managed by a Hypervisor or such other software. Containers are virtual systems with low footprint. A stand-alone system could be illustrated by a computer system 120. A host system could also be illustrated by one or more of the computer systems 120, and the VM would be in the memory/memories 170, and would be executed by the one or more processors 170. More detail on possible cloud implementations of a distributed application 115 are provided below. Each component 115, 116, 117, and 119 may be include or use a local storage 197 (197-1, 197-2, 197-3, and 197-4, respectively). The system in FIG. 2A also includes shared (e.g., virtual) storage service 198, and each component 115, 116, 117, and 119 has access to this shared storage service 198.

It is understood in that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 2B:
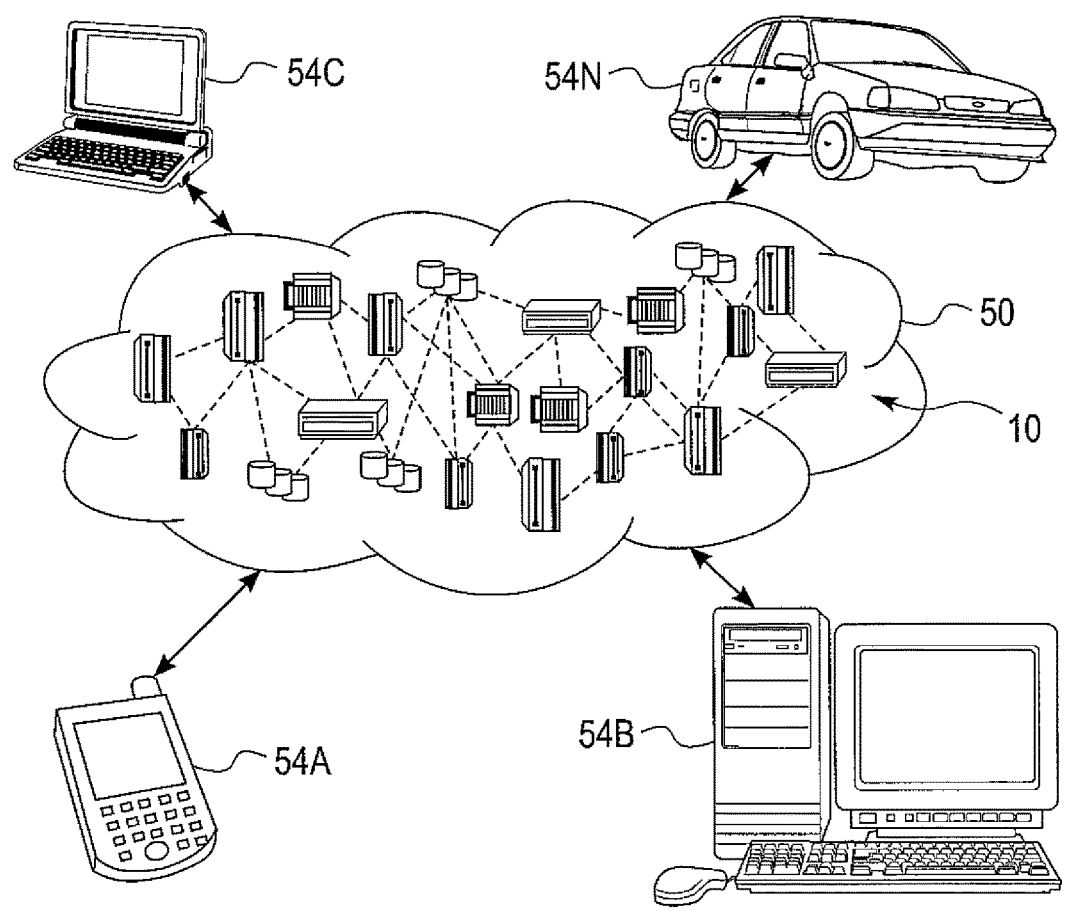
FIG. 2B depicts a cloud computing environment according to an embodiment.

Referring now to FIG. 2B, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system MN may communicate. The application 115 may be implemented using one or more of the nodes 10. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2B are intended to be illustrative only and that computing nodes 10 and cloud computing environment 50 can communicate with any type of computerized device over any type of network and/or network addressable connection (e.g., using a web browser).

Figure 2C:
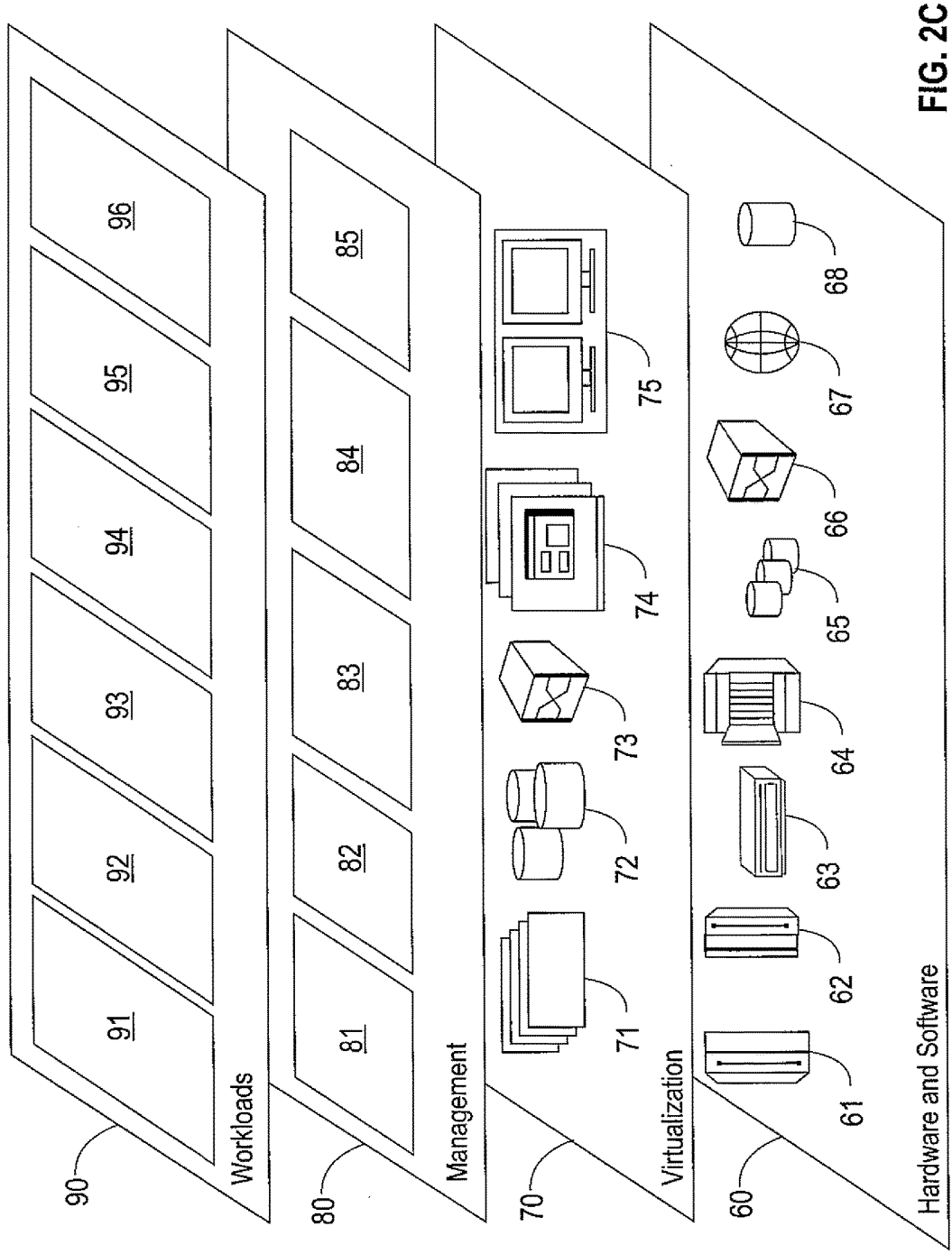
FIG. 2C depicts abstraction model layers according to an embodiment.

Referring now to FIG. 2C, a set of functional abstraction layers provided by cloud computing environment 50 (FIG. 2B) is shown. It should be understood in advance that the components, layers, and functions shown in FIG. 2C are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application 96, which is an embodiment of application 115 in this example.

The instant techniques might be best presented from the point of view of a user using the system, so this aspect will be described first. After that, additional detail on exemplary implementations will be described.

Figure 3:
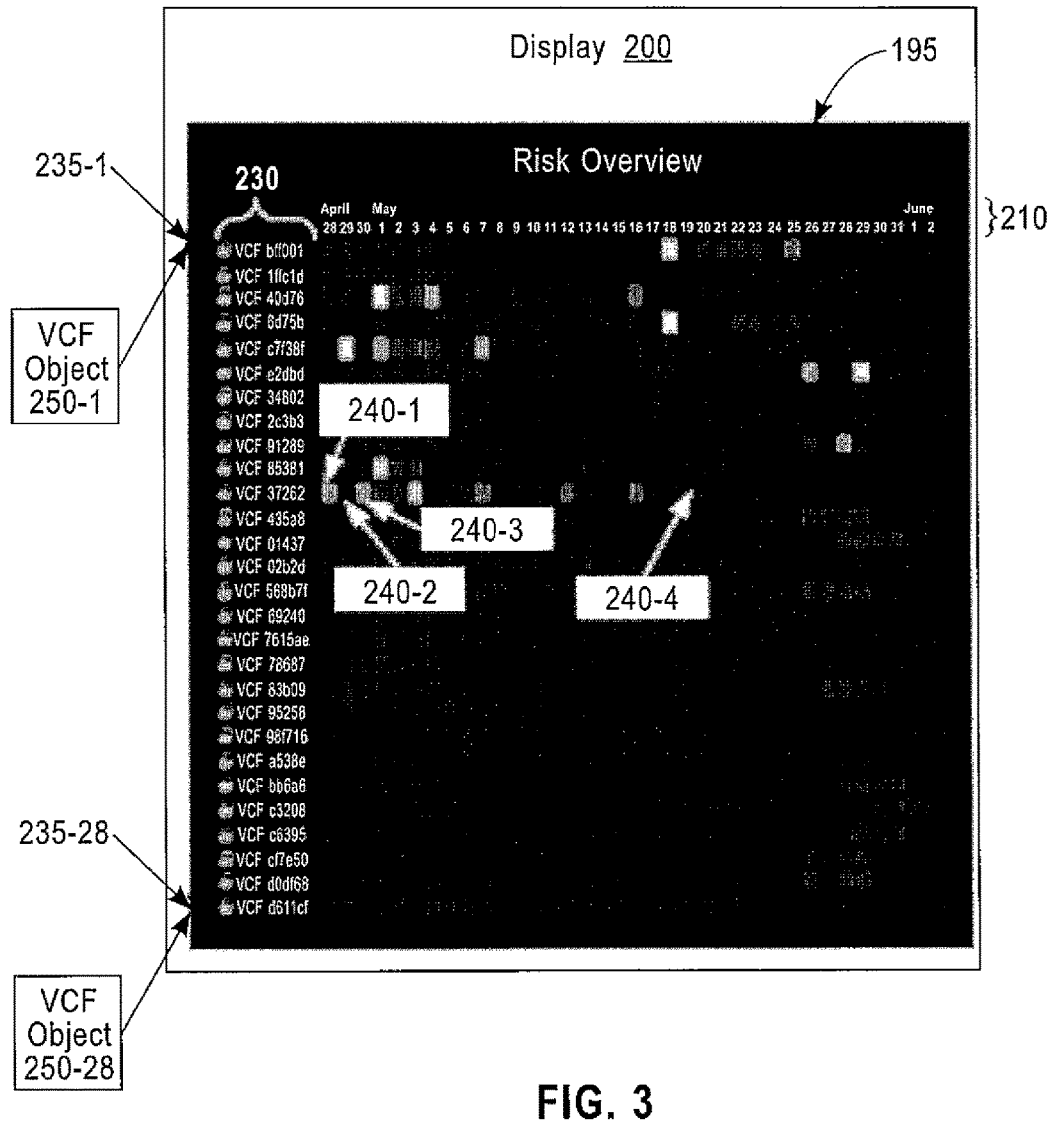
FIG. 3 is an example of a dashboard presented to a user for data-centric monitoring of compliance of applications, in an exemplary embodiment.

Referring to FIG. 3, this figure is an example of a dashboard 200 presented to a user for data-centric monitoring of compliance of applications, in an exemplary embodiment. The dashboard 200 is one way of representing risks to a user, but the instant embodiments are not limited to this particular technique. The dashboard 200 is an example of the dashboard 195 of FIG. 1, and the display 200 is one example of the user interface element(s) 173. The dashboard 200 is entitled "Risk Overview", and each column 210 corresponds to days of the month (from April 29, through all of May, and to part of June 3rd), while each row 230 corresponds to an indicator 235-1 through 235-28 of a VCF object 250-1 through 250-28 (that is, an object in the VCF format), respectively, and includes a unique ID (e.g., bf001 . . . , 1ffc1d . . . ), which is the UUID in this example. Each indictor 235 therefore has a one-to-one correspondence with a VCF object 250. The VCF objects are examples of data objects 160 that are being monitored. The dashboard may show all the data objects 250/160 being monitored but for large systems 100 will likely show only a set of the data objects 250/160 but not all the data objects. The dashboard 195 focuses therefore on risks to data, which are unique VCF objects 250. At each entry 240, some indication is made to quantify the risk accruing due to, e.g., a user, the network, and application events associated with a corresponding VCF object 250 for the particular day. Risks can be estimated to be, e.g., a value between 0-1 or 0-100 and this value can be shown as a color on the dashboard. One way to indicate the risks is via the color of each entry 240. Since the figure is in black and white, a description of the coloring will have to suffice. A "normal" risk (e.g., low risk) is indicated by reference 240-4 and may be dark green; a higher risk is indicated by reference 240-1 and may be light green; an even higher risk is indicated by reference 240-3, which may be pinkish; and the highest risk is indicated by reference 240-2, which is red. Other schemes, such as using a numbering system (e.g., higher numbers indicate higher risks) or lettering system (e.g., H for high, M for medium, L for low) may be used. Using color is simply one approach, and many other approaches are valid.

The user has the ability to select an entry 250 to get more detail about the risk.

Now that one example from point of view of a user using the system has been presented, additional detail on exemplary implementations is described.

Referring now to FIG. 4, which includes FIGS. 4A, 4B, and 4C, this figure is a logic flow diagram for data-centric monitoring of compliance of applications. This figure also illustrates the operation of an exemplary method, a result of execution of computer program instructions embodied on a computer readable memory, functions performed by logic implemented in hardware, and/or interconnected means for performing functions in accordance with exemplary embodiments. Many of the blocks in FIG. 4 are assumed to be performed by the compliance monitoring computer system 110, e.g., under control in part by the data centric monitor 101. That is, the data centric monitor 101 is programmed via computer-readable code and/or hardware logic to cause the compliance monitoring computer system 110 to perform blocks in FIG. 4 (and also FIG. 5).

In reference to FIG. 4A, the compliant paths and configurations 305, compliance rules/policies and ranks 310, authorized events 315, authorized/permitted data and control flow events 320, and vulnerabilities 325 are provided by a user (e.g., as provided information 107 of FIG. 3). The vulnerabilities 325 may include vulnerability scores 326, which are provided. These scores are available from CVE (CVSS scores as per NVD), vulnerability scan reports, APPSCAN dynamic scans, and APPSCAN source scans, and other sources. APPSCAN is an IBM product that enhances web application security and mobile application security, improves application security program management and strengthens regulatory compliance, by scanning web and mobile applications prior to deployment. CVE is a list of information security vulnerabilities and exposures that aims to provide common names for publicly known problems. Ranks of compliance rules (see reference 310) are used to assign degrees of importance to each compliance rule. Each compliance regulation has a number of rules (HIPAA has 59 rules). Ranks are assigned to each of these rules such that if a rule X has a rank of 10 and another rule Y has a rank of 5, then X has more weightage than Y. In another implementation of this method, X maybe regarded to have less weightage than Y because X has higher rank than Y. These ranks are either pre-specified to the system, or are computed by a method.

In block 340, the compliance monitoring computer system 110 gets (e.g., collects) logged IT events (e.g., and may store these as the logged IT events 111 of FIG. 1). For instance, the compliance monitoring computer system 110 could collect logs of events as follows: each event 'e' is directly or indirectly related to an action on a data object 160. Each logged event could contain (for instance) the following: the system/component where the log was generated; what was the data object 160 (such as UUID referring to that object); when the event occurred and or the duration; userid(s) associated with the event; IP address(es) for the event; other data objects 160 and/or information for the event. In an exemplary embodiment, an access of a user to a system that is processing or has stored the sensitive data is a 'related event'. The compliance monitoring computer system 110 may receive logs from different system components, application components, middleware components as well as network and non-functional components. The events are collected by each component in the distributed application and the underlying system and stored in the respective log management system or a file system. Some components may or may not log their events. The logs are then collected from each of these log management systems or file systems and brought to the data-centric compliance monitoring (DCCM) system (e.g., compliance monitor 110) via a pull or push method or a combination of push and pull methods depending on the types of components. In a pull method, the DCCM system collects the data from the log management systems, whereas in push method the log management system of one or more components sends the logs to the DCCM. The log collection by DCCM can be real-time.

In block 335, the compliance monitoring computer system 110 performs big data for log analytics. Big data in this context includes data analysis over a large dataset. Block 335 receives information from blocks 305, 310, 315, 320, 325, and 340. One example of possible data analysis is shown in FIG. 4B.

In FIG. 4B, the compliance monitoring computer system 110 identifies in block 336 a set of compliance rules to be monitored. The set of compliance rules to be monitored are specified by compliance rules/policies, and ranks 310.

In block 337, the compliance monitoring computer system 110 identifies a set of sensitive data objects 160. This set of sensitive data objects (such as healthcare records) are objects 160 that need to be protected as part of the compliance requirements (e.g., as per the compliance rules/policies in 310), and may identify other data objects (such as keys, passwords) that are used to protect the data objects 160 and the system. Sensitive data objects stored/processed/transmitted by an application are specified by the system administrator and/or the application administrator.

In block 338, the compliance monitoring computer system 110 identifies entities of a service (a service is a running instance of the distributed application) that are authorized to carry out some form of access to a sensitive data object 160. Such entities may be stored in the storage components local 197 and shared 198, and may be network devices (such as intrusion protection services, firewalls, routers and switches, VPN gateways, as examples), and other entities of the service that are authorized to some form of access to a sensitive data object 160. Data flow and control flow paths and configurations of the applications that are compliant with respect to the compliance requirements 305, compliance rules and ranks 310, authorized events 315, authorized and permitted data and control flow events 320 and vulnerabilities of the application components 325 are specified by the system and/or application administrator and such information is subject to change. The identified entities may store, transmit, process, or get temporary storage for a data object 160. Block 338 may include identifying the time and other meta-data associated with such authorized access.

The compliance monitoring computer system 110 in block 339 identifies a set of authorized events (e.g., using the supplied authorized events 315) that have occurred in the logged IT events. Such events may include events classified as "normal". The authorized events may include accesses and operations on the sensitive data objects 160 with other meta-data, characterized in an example as the following: what (e.g., IDs of data objects 160); where (e.g., IP addresses/component names); who (e.g., user IDs); when (e.g., time and/or duration); and how (e.g., operation to gain access, what other information used, etc.), and the like.

Returning to FIG. 3A, in block 330, the compliance monitoring computer system 110 assigns ranks (e.g., weights) to compliance rules. This may use a pre-defined table of ranks, such as one provided by the compliance rules/policies, and ranks 310.

In block 331, the compliance monitoring computer system 110 identifies a vulnerability (or vulnerabilities) of the system using an attack graph of the application 115. The attack graph is an input to the method of FIG. 4.

In block 345, the compliance monitoring computer system 110 correlates events for data objects 160. Specifically, the compliance monitoring computer system 110 may correlate the log events based on the ID (e.g., UUID) of data objects 160. Additionally, the compliance monitoring computer system 110 may pivot streams from the log(s) to be indexed by the specific data item (e.g., specified by the ID). Pivoting the streams means the data streams are matched and co-related with respect to a specific identifier(s) such as UUID specifying data objects. Events may be correlated across time, IP addresses, user names, and the like. Block 345 receives information from block 335.

The compliance monitoring computer system 110 in block 350 identifies events that are not authorized. Such unauthorized may include anomalous events and include accesses/operations to sensitive data objects 160 (e.g., identified previously in block 337). Block 350 uses information at least from blocks 315, 320, 335 and 345.

In block 355, the compliance monitoring computer system 110 identifies potential vulnerabilities. In particular, the compliance monitoring computer system 110 can identify potential vulnerabilities of the system/components that have access to the sensitive data objects 160 (e.g., determined in block 337). Block 355 uses data from at least from blocks 345 and 350.

The compliance monitoring computer system 110 in block 360 maps each of these unauthorized events to the compliance rules (e.g., the compliance rules to be monitored determined in block 336). Block 360 uses information from block 355 and 350. Output from block 360 may include a set of compliance rules and policies being violated 365, where the degree of compromise 370 is non-zero. Concerning the degree of compromise 370, the degree of compromise is a measure that is estimated based on the vulnerabilities of the components and the unauthorized events and sensitivity of data that have been exposed. The degree of compromise 370 varies from 0-1, 0 (zero) being the fact that the application is not compromised at all (e.g., no unauthorized events have occurred), and 1 (one) being that the application has been compromised such that all the sensitive data may have been breached.

In block 375, the compliance monitoring computer system 110 computes risk. Block 375 takes input from blocks 330, 350, 365, and 370. Examples of block 375 are shown in FIG. 4C. The compliance monitoring computer system 110 computes (block 376) risk of non-compliance for each data object 160, such as risk associated with the unauthorized events previously determined in block 350. For example, block 376 may entail computing risk based on one or more of the following: a size of the data object 160; a "weight" assigned to the data object 160; weights assigned to the compliance rules; weights assigned to the anomalous events (with respect to the weights of the normal events); and/or vulnerabilities of the system. Additionally, block 376 may include aggregating the weights. One example is to aggregate the risks and normalize the aggregated value to 0-100. One such example technique would be to aggregate the following risks: risk of each data object, each anomalous event, each compliance rule, each vulnerability in the system as per block 331, and such other risks. Each risk is either the weight of the entity or multiplication of the weights (such as for each data object: multiply the size in bytes with the weight of the anomalous events associated with that data object).

Block 375 may also include block 337, where the compliance monitoring computer system 110 computes risk of non-compliance for each component, and in turn for the service. Block 377 may include computing risk of non-compliance for each component, and in turn for the service from the individual measures of risk-of-non-compliance of each of the data objects 160.

The compliance information 175 from FIG. 1 may capture any compliance information such as blocks 365 and 370, and the output of block 375 (compute risk). The compliance information 175 is then used to perform block 380.

In block 380, the compliance monitoring computer system 110 outputs dashboard information, which may be thought of as information allowing a user to determine the estimated risks for the selected set of data objects. Such information may be used to display a dashboard 195 to a user on a display, for instance, or could be data suitable for use for another computer (such as a webserver) to be able to display the dashboard or some other display system for viewing risk associated with data objects. In another example, block 380 can actively display the dashboard information, as described in FIG. 5.

Figure 5:
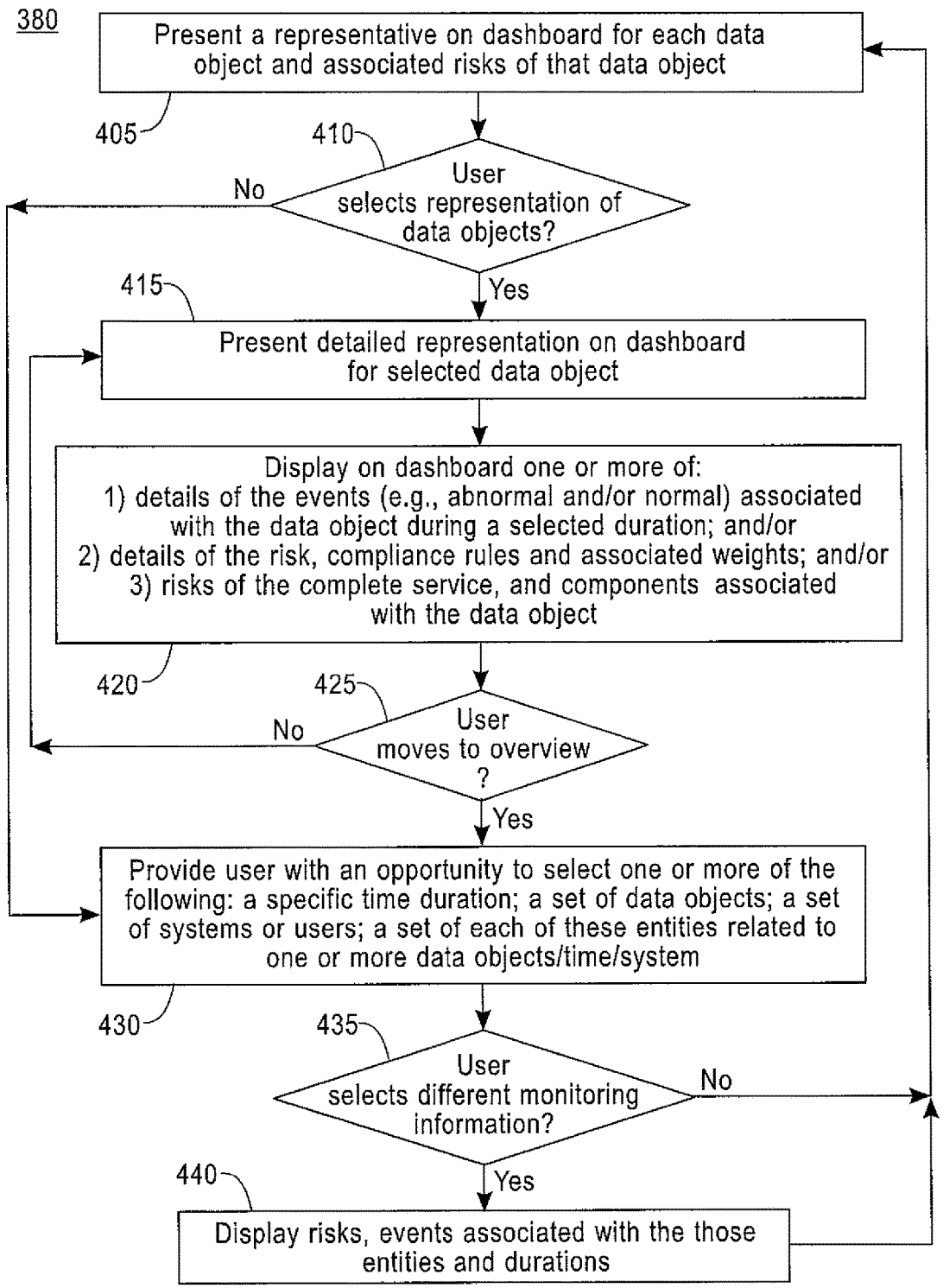
FIG. 5 is a logic flow diagram for displaying and updating a dashboard used for data-centric monitoring of compliance of applications in an exemplary embodiment, and illustrates the operation of an exemplary method, a result of execution of computer program instructions embodied on a computer readable memory, functions performed by logic implemented in hardware, and/or interconnected means for performing functions in accordance with exemplary embodiments.

Turning to FIG. 5, this figure is a logic flow diagram for displaying and updating a dashboard used for data-centric monitoring of compliance of applications in an exemplary embodiment. This may be considered one implementation of block 380 of FIG. 4. FIG. 5 also illustrates the operation of an exemplary method, a result of execution of computer program instructions embodied on a computer readable memory, functions performed by logic implemented in hardware, and/or interconnected means for performing functions in accordance with exemplary embodiments. The blocks in FIG. 5 are assumed to be performed by the compliance monitoring computer system 110, e.g., under control in part by the data centric monitor 101. That is, the data centric monitor 101 is programmed via computer-readable code and/or hardware logic to cause the compliance monitoring computer system 110 to perform blocks in FIG. 5.

In block 405, the compliance monitoring computer system 110 presents a representation on dashboard for each data object and associated risks of that data object. Such representations may be, for instance, the colored entries 240 of FIG. 3, each of which corresponds to a VCF object 250. One example is therefore to color-code the risk, where risks 0-100 are represented in a scale from green to red. Many other examples are possible. Also, the dashboard 195 in FIG. 3 is based on a time scale (days in the example of FIG. 3), but other representations for data objects 160/250 are possible, such as monitored computer systems 120, virtual machines, networks, and the like.

The user is allowed to select a representation (such as a colored entry 240) and it is determined in block 410 if the user does select a representation of an object. If the user does select a representation of a data object 160/250 (block 410=Yes), flow proceeds to block 415, where the compliance monitoring computer system 110 presents detailed representation on the dashboard 195 for selected data object 160. See block 415. Examples of such detailed representation include (block 420) displaying on the dashboard one or more of: 1) details of the events (e.g., abnormal and/or normal) associated with the data object during a selected duration; and/or 2) details of the risk, compliance rules and associated weights; and/or 3) risks of the complete service, and components associated with the data object. Note that, depending on implementation, the user may be able to delve deeper into any or all of 1), 2), and/or 3), too, although this is not shown in FIG. 5.

In block 425, the compliance monitoring computer system 110 allows the user to move to the overview (e.g., as illustrated by dashboard 195 of FIG. 3). If the user does not move to the overview (e.g., by clicking on a "back" button or anything else that can let the compliance monitoring computer system 110 know the user wants to move to the overview) (block 425=No), flow goes back to block 415. If the user does want to move to the overview (block 425=Yes) or if the user does not select a representation of a data object 160/250 (block 410=No), in block 430 the compliance monitoring computer system 110 provides the user with an opportunity to select one or more of the following: a specific time duration; a set of data objects; a set of systems or users; a set of each of these entities related to one or more data objects/time/system. If the user selects different monitoring information (block 435=Yes), the compliance monitoring computer system 110 in block 440 displays risks, events associated with the those entities and durations. If the user does not select different monitoring information (block 435=No) or block 440 has been performed, the flow proceeds to block 405.

It is noted that the user (e.g., a person) using the system would typically perform mitigation of the risk for the data objects. For instance, if there is a computer system that is allowing unauthorized users access to restricted data objects, then the user would determine why the computer system is allowing the unauthorized users access and correct this.

Figure 6:
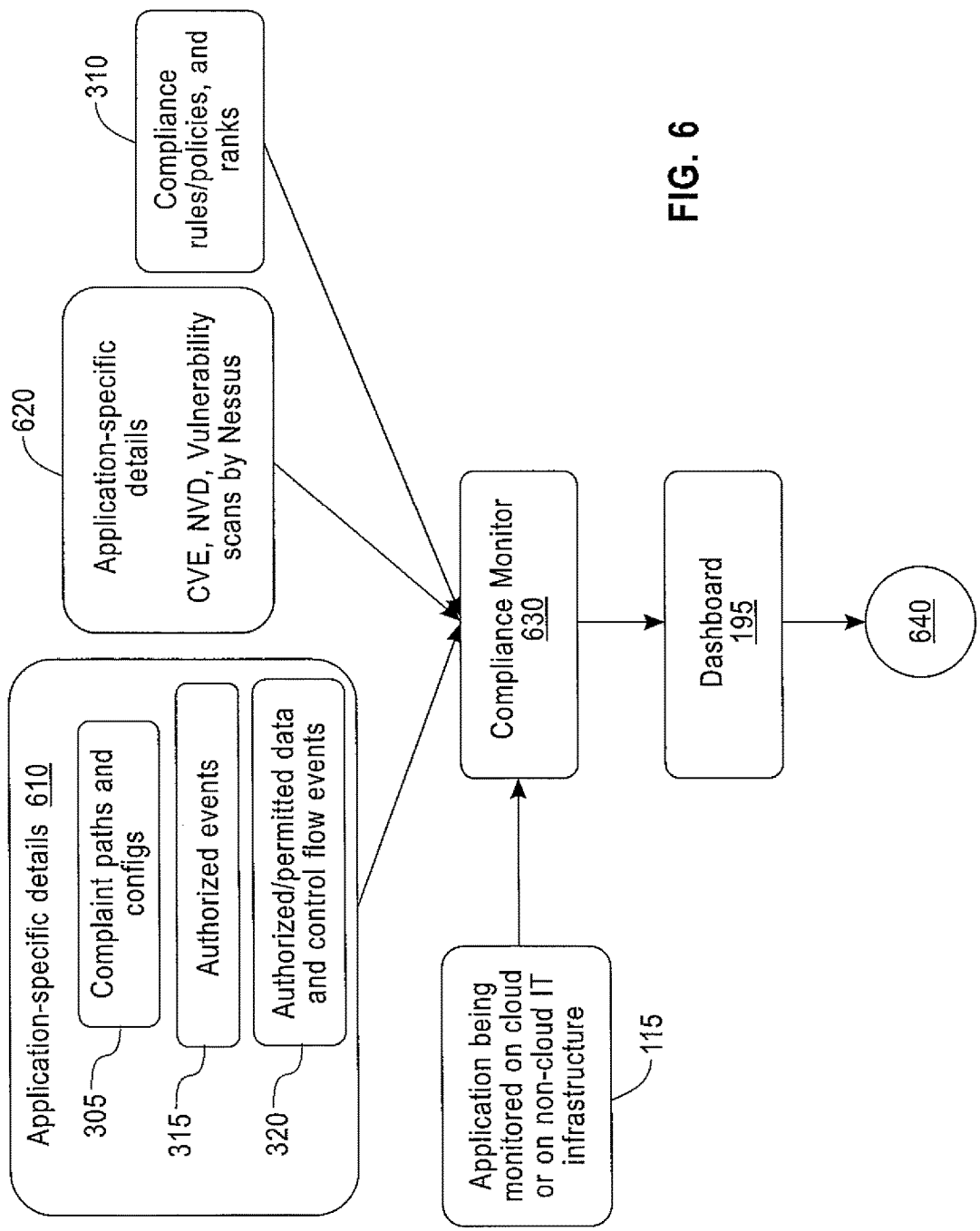
FIG. 6 is another way of looking at a portion of the exemplary system of FIG. 1 based on part of the description of FIG. 4.

Turning to FIG. 6, this figure is another way of looking at a portion of the exemplary system of FIG. 1 based on part of the description of FIG. 4. In the application-specific details 610, the compliant paths and configurations 305, the authorized events 315, and the authorized/permitted data and control flow events 320 have been placed. The application-specific details 620 include such items as CVEs, NVD information, and vulnerability scans by Nessus (which is a vulnerability scanner for auditors and security analysts and a tool designed to automate the testing and discovery of known security problems). The application-specific details 620 can be considered to be part of the logged IT events 340. The compliance rules/policies, and ranks 310 are also shown. The application 115 that is being monitored can be monitored on the cloud 50, or on a non-cloud infrastructure. The compliance monitor 630 is a version of the data-centric monitor 101 of FIG. 1. Reference 640 indicates compliance monitoring/auditing personnel, such as a person examining a system for compliance.

FIG. 6 is merely one way of examining how a system may be structured and is merely an example. Additional entities from FIG. 4 may also be added to FIG. 6. For example, the authorized events 315 and the authorized/permitted data and flow control events 320 would likely fit in the application-specific details 610. Application-specific details 620 are vulnerabilities 325 in this example (and may include the vulnerability scores 326).

Figure 7:
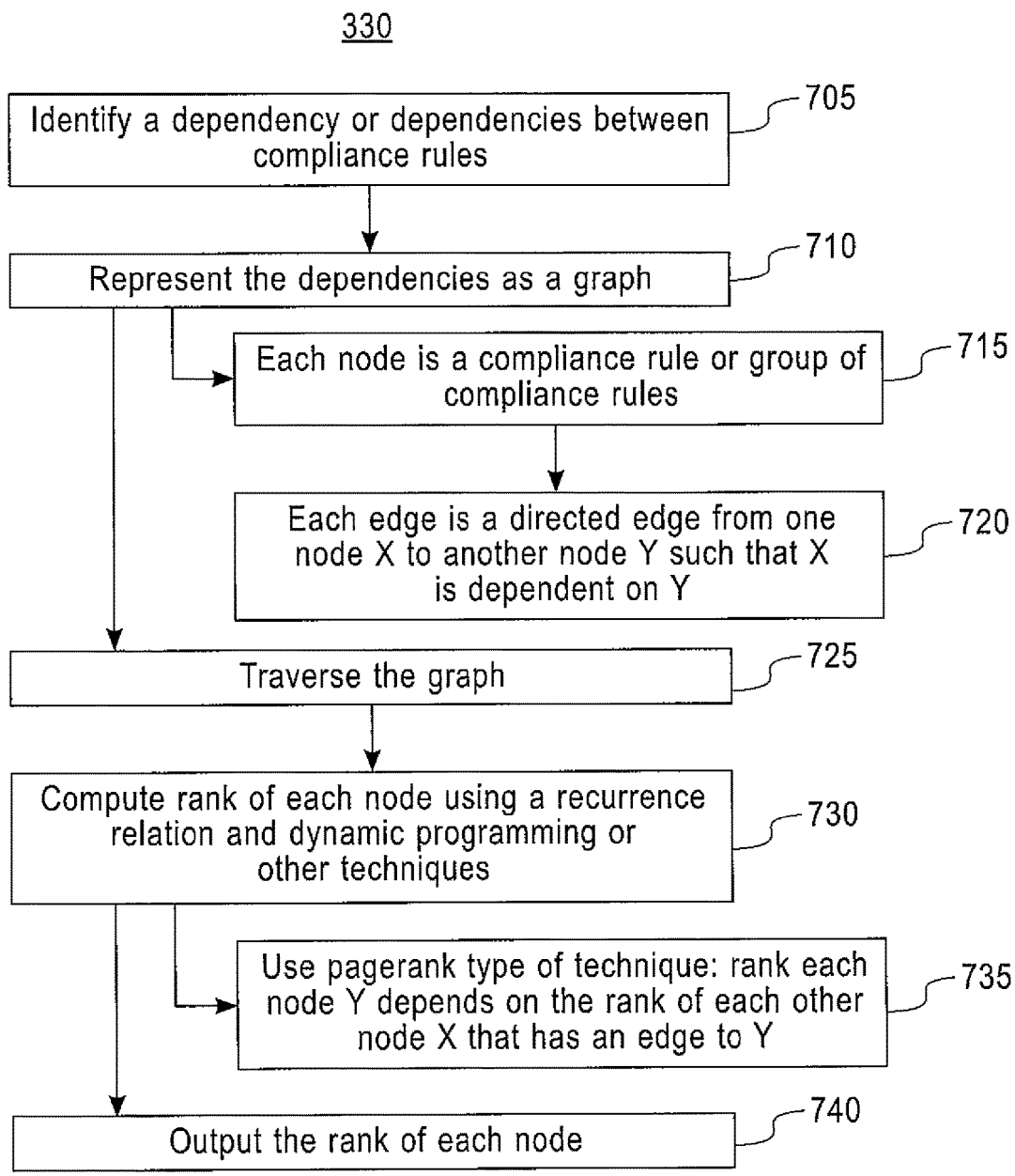
FIG. 7 is a logic flow diagram for computation of compliance ranks in an exemplary embodiment, and illustrates the operation of an exemplary method, a result of execution of computer program instructions embodied on a computer readable memory, functions performed by logic implemented in hardware, and/or interconnected means for performing functions in accordance with exemplary embodiments.

Referring to FIG. 7, this figure is a logic flow diagram for computation of compliance ranks in an exemplary embodiment. This figure also illustrates the operation of an exemplary method, a result of execution of computer program instructions embodied on a computer readable memory, functions performed by logic implemented in hardware, and/or interconnected means for performing functions in accordance with exemplary embodiments. The blocks FIG. 7 are assumed to be performed by the compliance monitoring computer system 110, e.g., under control in part by the data centric monitor 101. FIG. 7 is an example of block 330 of FIG. 4.

Figure 8:
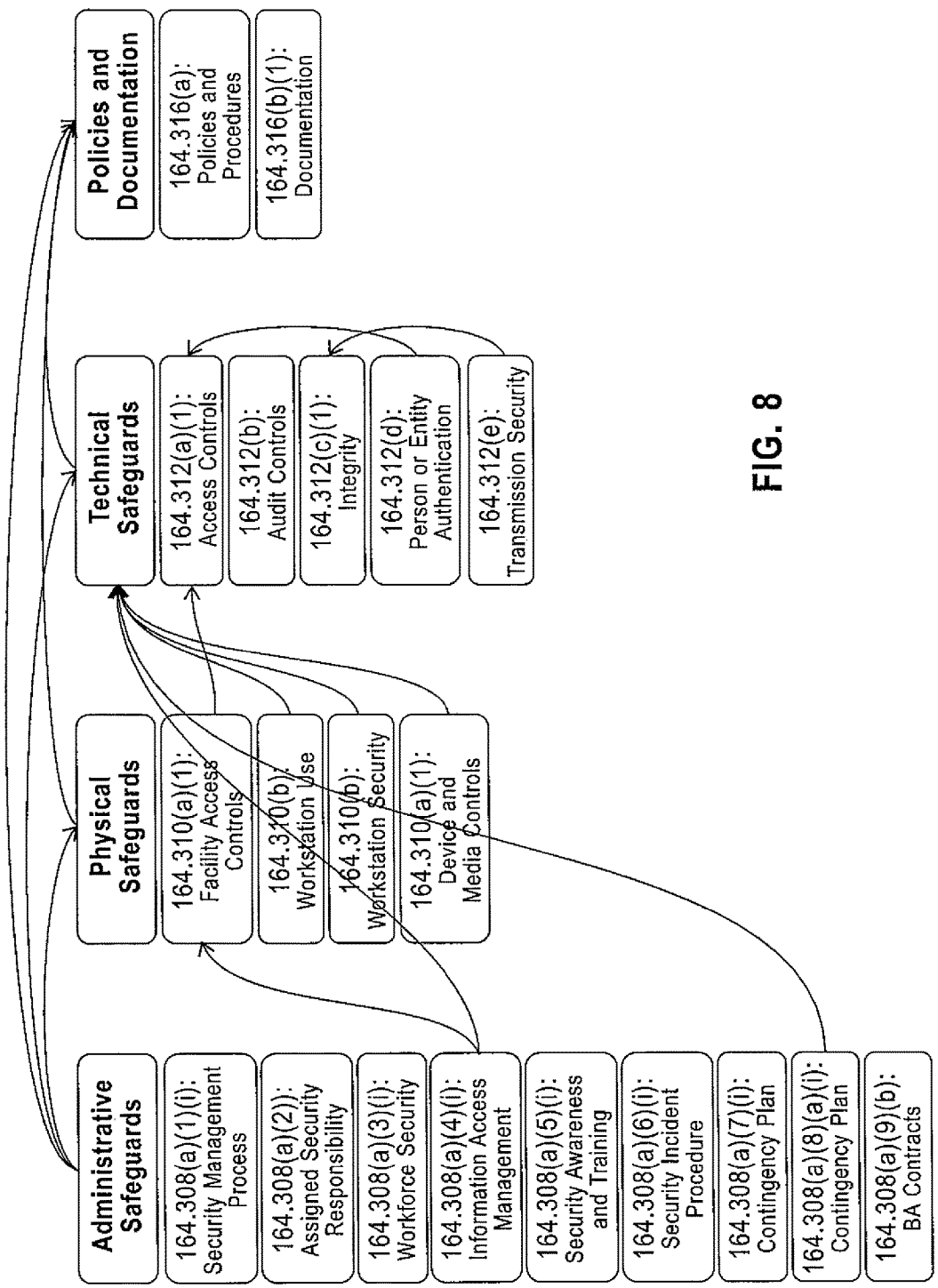
FIG. 8 is an example of a HIPAA compliance dependency graph.

In block 705, the compliance monitoring computer system 110 identifies a dependency or dependencies between compliance rules. Such a dependency or dependencies may be identified using, for example, a HIPAA dependency graph as show in FIG. 8 or other graph. In FIG. 8, the numbers are the sections of the HIPAA. The administrative safeguards are dependent on the physical safeguards, the technical safeguards, and the policies and documentation. The physical safeguards are dependent on the technical safeguards, while the technical safeguards are dependent on the policies and documentation. Each of the safeguards at the top of a column corresponds to the sections in that column. For instance, the physical safeguards include the sections 164.310(s)(1): Facility Access Controls, 164.310(b): Workstation Use, 164.310(b): Workstation Security, and 164.310 (a)(1): Device and Media Controls. It can be seen that (as one example) section 163.308(a)(4)(i) is dependent on section 164.310(a)(1) and the technical safeguards. That is, section 164.310(a)(1) is dependent on all of the sections in the technical safeguards, although this is merely exemplary. Similarly, section 164.308(a)(7(i) is dependent on the technical safeguards. Other relationships are illustrated by the figure.

In block 710, the compliance monitoring computer system 110 represents the dependencies as a graph. For instance, in block 715, the compliance monitoring computer system 110 can represent each node as a compliance rule or group of compliance rules and in block 720, the compliance monitoring computer system 110 can represent each edge as a directed edge from one node X to another node Y such that X is dependent on Y. Such dependencies and their corresponding graph may be determined using FIG. 8 as an example.

In block 725, the compliance monitoring computer system 110 traverses the graph. In block 730, the compliance monitoring computer system 110 computes a rank of each node using a recurrence relation and dynamic programming or other techniques. As an example, in block 735, the compliance monitoring computer system 110 uses a pagerank type of technique: the rank of each node Y depends on the rank of each other node X that has an edge to Y. In block 740, the compliance monitoring computer system 110 outputs the rank of each node, which is the rank of each compliance rule. The leaves are assigned an initial rank such as 1.

Figure 9:
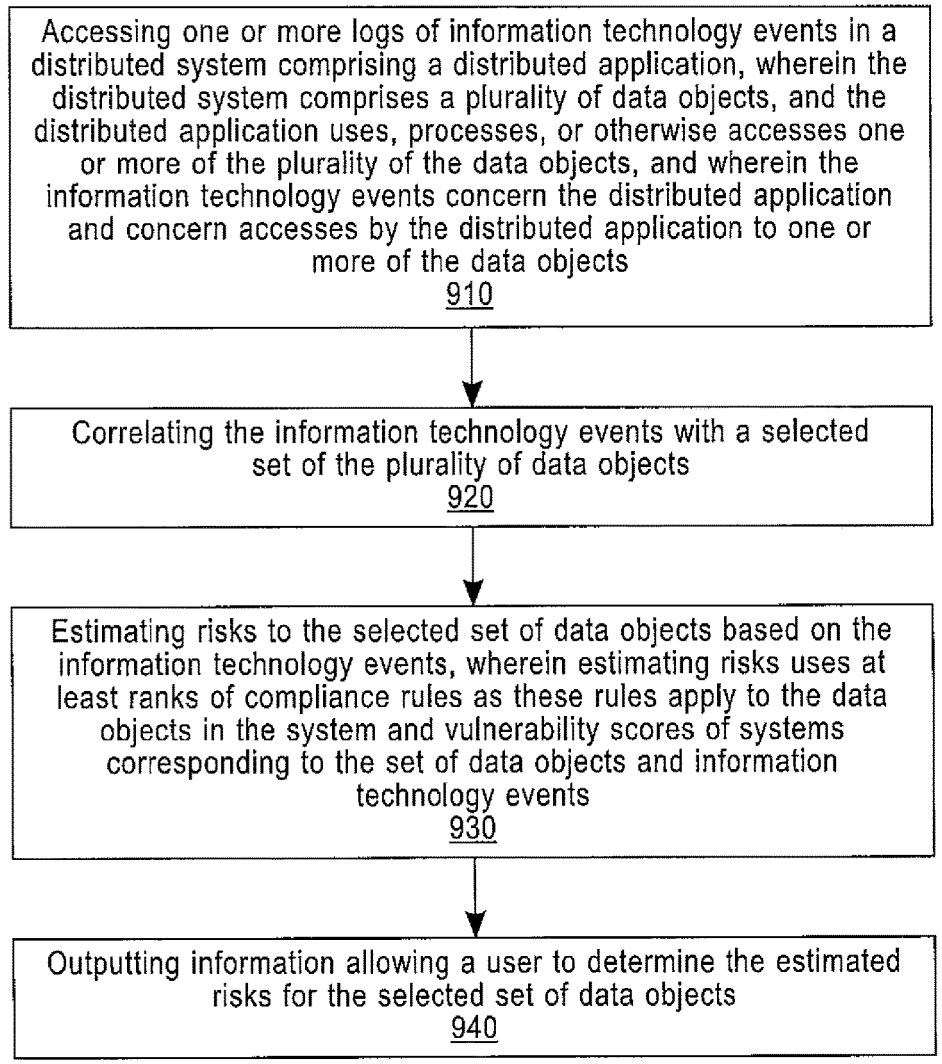
FIG. 9 is a logic flow diagram for data-centric monitoring of compliance of a distributed application in an exemplary embodiment, and illustrates the operation of an exemplary method, a result of execution of computer program instructions embodied on a computer readable memory, functions performed by logic implemented in hardware, and/or interconnected means for performing functions in accordance with exemplary embodiments.

Turning to FIG. 9, this figure is a logic flow diagram for data-centric monitoring of compliance of a distributed application in an exemplary embodiment. This figure also illustrates the operation of an exemplary method, a result of execution of computer program instructions embodied on a computer readable memory, functions performed by logic implemented in hardware, and/or interconnected means for performing functions in accordance with exemplary embodiments. The blocks in FIG. 9 may be assumed to be performed by a computer system 110, e.g., under the control at least in part of the data-centric monitor 101.

In block 910, the computer system 110 performs accessing one or more logs of information technology events in a distributed system comprising a distributed application. The distributed system comprises a plurality of data objects, and the distributed application uses, processes, or otherwise accesses one or more of the plurality of data objects. The information technology events concern the distributed application and concern accesses by the distributed application to one or more of the data objects. In block 920, the computer system 110 performs correlating the information technology events with a selected set of the plurality of data objects.

In block 930, the computer system 110 performs estimating risks to the selected set of data objects based on the information technology events. The estimating risks uses at least ranks of compliance rules as these rules apply to the data objects in the system and vulnerability scores of systems corresponding to the set of data objects and information technology events. In block 940, the computer system 110 performs outputting information allowing a user to determine the estimated risks for the selected set of data objects.

The flow in FIG. 9 is also referred to as example 1 herein. The following are additional examples related to this example.

Example 2

The method of example 1, wherein outputting information further comprises outputting information suitable for display to the user and comprising visual indications of the risk for the selected set of data objects.

Example 3

The method of example 2, wherein the visual indications comprise a color code from a range of colors from a first color to a second color, and wherein outputting information further comprises outputting an indication of the color code for each data object in the selected set of data objects.

Example 4

The method of example 2, wherein outputting further comprises outputting, in response to the user selecting a representation of a selected one of the set of data objects, information for a detailed representation on a dashboard for the selected data object.

Example 5

The method of example 4, wherein the detailed representation comprises one or more of the following: details of information technology events associated with the selected data object during a selected duration; details of the risk, compliance rules and associated weights associated with the selected data object; or risks of a complete service and risks of components associated with the data object.

Example 6

The method of example 2, wherein: the method further comprises providing the user with an opportunity to select one or more of the following criteria: a specific time duration; a subset of the set of data objects; a set of systems or users; or a set of each of these entities related to one or more of the specific time duration, subset of data objects, or the set of systems or users; and outputting information further comprises outputting information enabling display to the user of risks and information technology events associated with the selected criteria.

Example 7

The method of example 1, wherein: estimating risks comprises: aggregating at least two of the following risks to an aggregated value for one or more of the selected set of data objects: risk corresponding to each data object; risk corresponding to each anomalous event; risk corresponding to each compliance rule; or risk corresponding to each vulnerability of the system; and normalizing the aggregated value to a range of values; and outputting comprises outputting the aggregated value for the one or more of the selected set of data objects.

Example 8

The method of example 7, further comprising determining each vulnerability of the system using an attack graph for the distributed application.

Example 9

The method of example 7, wherein each risk is a weight of a corresponding entity.

Example 10

The method of example 7, wherein a risk used to determine the aggregated risk is determined by multiplication of weights for entities from multiple risks.

Example 11

The method of example 10, wherein a risk used to determine the aggregated risk is determined by, for a given data object, multiplying a size in bytes of the given data object with a weight of anomalous events associated with that given data object.

Example 12

The method of example 7, wherein the aggregated value is normalized to a range of values from zero to one hundred:

Example 13

The method of example 1, wherein estimating risks comprises computing risk based on one or more of the following: a size of a given data object; a weight assigned to the given data object; weights assigned to compliance rules; or weights assigned to anomalous events, wherein weights assigned to anomalous events are assigned with respect to weights of normal events.

Example 14

The method of example 1, further comprising determining the ranks of the compliance rules as follows: identifying dependencies between compliance rules; representing the dependencies as a graph having nodes and edges, wherein each node represents a compliance rule or a group of compliance rules, and wherein each edge is a directed edge from a first node to another node such that the first node is dependent on the other node; traversing the graph and computing rank of each node using one of a recurrence relation or dynamic programming; and outputting the rank of each node.

Example 15

The method of example 14, wherein computing rank using a recurrence relation comprises using a pagerank algorithm wherein a rank of each node Y depends on the rank of each other node X that has an edge to Y.

Another example is computer system comprising one or more memories comprising computer-readable code and one or more processors. The computer system performs the method of any of the examples of 1-15, responsive to execution by the one or more processors of the computer-readable code. A further example is a computer program product comprising a computer-readable storage medium comprising computer-readable code that causes a computer system to perform the operations of the method of any of the examples of 1-15.

Figure 10:
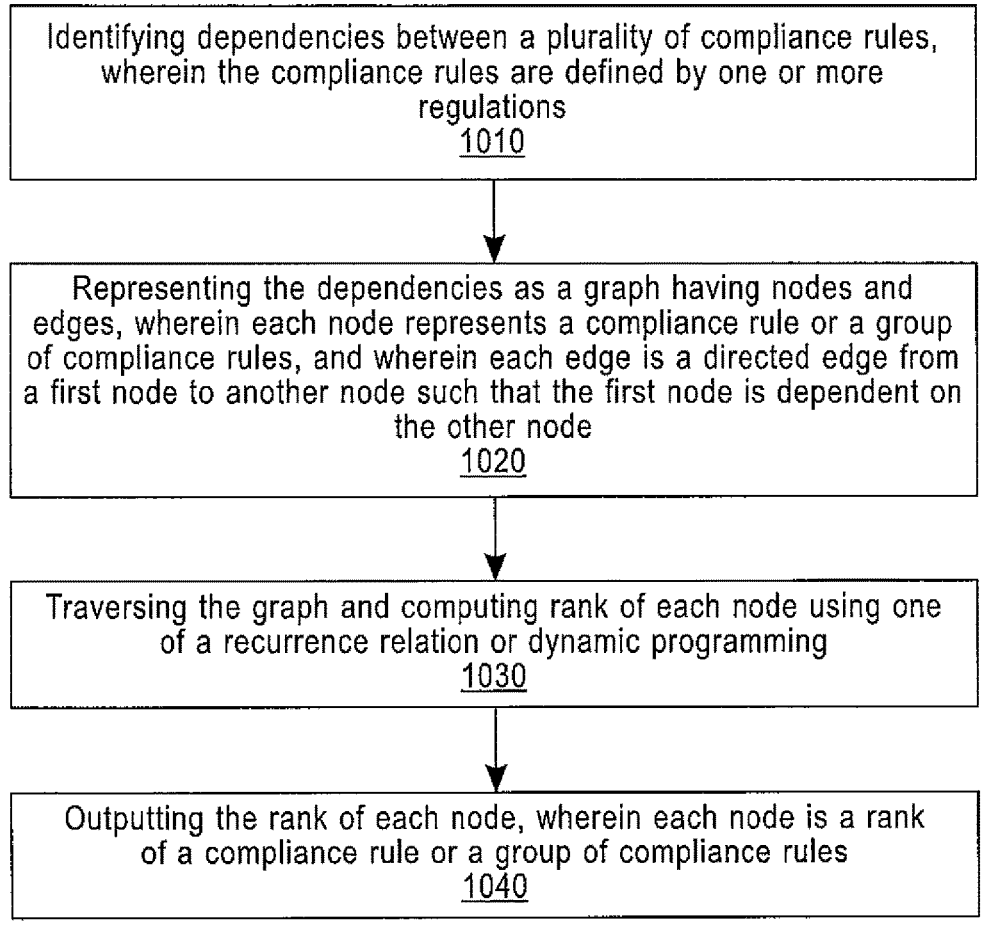
FIG. 10 is a logic flow diagram for determining ranks of compliance rules in an exemplary embodiment, and illustrates the operation of an exemplary method, a result of execution of computer program instructions embodied on a computer readable memory, functions performed by logic implemented in hardware, and/or interconnected means for performing functions in accordance with exemplary embodiments.

Referring now to FIG. 10, this figure is a logic flow diagram for determining ranks of compliance rules in an exemplary embodiment. This figure further illustrates the operation of an exemplary method, a result of execution of computer program instructions embodied on a computer readable memory, functions performed by logic implemented in hardware, and/or interconnected means for performing functions in accordance with exemplary embodiments. The blocks in FIG. 10 may be assumed to be performed by a computer system 110, e.g., under the control at least in part of the data-centric monitor 101.

In block 1010, the flow comprises identifying dependencies between a plurality of compliance rules, wherein the compliance rules are defined by one or more regulations. This block may be performed by a person or possibly by computer system 110. In block 1020, the flow comprises representing the dependencies as a graph having nodes and edges, wherein each node represents a compliance rule or a group of compliance rules, and wherein each edge is a directed edge from a first node to another node such that the first node is dependent on the other node. Representing the dependencies may be programmed into the computer system 110 by a person, or the computer system 110 may perform this block. In block 1030, the computer system 110 performs traversing the graph and computing rank of each node using one of a recurrence relation or dynamic programming, and in block 1040, the computer system 110 performs outputting the rank of each node, wherein each node is a rank of a compliance rule or a group of compliance rules.

The flow in FIG. 10 is also called example 16 herein. The following are additional examples based on the flow in FIG. 10.

Example 17

The method of example 16, wherein computing rank using a recurrence relation comprises using a pagerank algorithm wherein a rank of each node Y depends on the rank of each other node X that has an edge to Y.

Example 18

The method of example 16, wherein the plurality of compliance rules are one of Health Insurance Portability and Accountability Act or Family Educational Rights and Privacy Act compliance rules.

Another example is computer system comprising one or more memories comprising computer-readable code and one or more processors. The computer system performs the method of any of the examples of 16-18, responsive to execution by the one or more processors of the computer-readable code. A further example is a computer program product comprising a computer-readable storage medium comprising computer-readable code that causes a computer system to perform the operations of the method of any of the examples of 16-18.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following abbreviations that may be found in the specification and/or the drawing figures are defined as follows:

CVE Common Vulnerabilities and Exposures
CVSS Common Vulnerability Scoring System
DCCM Data-Centric Compliance Monitoring
FERPA Family Educational Rights and Privacy Act HIPAA Health Insurance Portability and Accountability Act
IBM International Business Machines Corporation
ID identifier
IP Internet Protocol
IT Information Technology
LAN Local Area Network
NVD National Vulnerability Database
OS Operating System
SSH secure shell
UUID Universally Unique ID
VCF Variant Call Format
VM Virtual Machine
WAN Wide Area Network
WAS WebSphere Application Server

What is claimed is:

1. A method comprising:
monitoring a distributed application, by a computer system, using one or more logs of information technology events in a distributed system comprising the distributed application, wherein the distributed application is an application that is executed on multiple computers simultaneously within the distributed system, and wherein the monitoring comprises collecting information technology events by a plurality of components in the distributed application,
wherein the distributed system comprises a plurality of data objects, and the distributed application uses, processes, or otherwise accesses one or more of the plurality of the data objects, and
wherein the information technology events concern the distributed application and concern accesses by the distributed application to one or more of the data objects;
correlating, by the computer system, the information technology events with a selected set of the plurality of data objects;
estimating, by the computer system, risks to the selected set of data objects based on the information technology events,
wherein estimating risks uses at least ranks of compliance rules as these rules apply to the data objects in the system and vulnerability scores of components of the distributed application corresponding to the set of data objects and information technology events,
wherein the estimated risks include a breach of the compliance rules associated with the selected set of data objects, and
wherein the compliance rules are defined by one or more regulations; and
displaying, by the computer system, information allowing a user to determine the estimated risks for the selected set of data objects, wherein the information displayed by the computer system provides the user with an estimated risk of a breach of the regulatory compliance requirements, including user selectable representations of data objects used for data-centric monitoring of compliance applications, and comprising visual indications of the estimated risk for the selected set of data objects, wherein the displayed information allows the user to perform mitigation of the estimated risks for at least one of the selected set of data objects.

2. The method of claim 1, wherein the visual indications comprise a color code from a range of colors from a first color to a second color, and wherein displaying information further comprises displaying an indication of the color code for each data object in the selected set of data objects.

3. The method of claim 1, wherein displaying further comprises displaying, in response to the user selecting a representation of a selected one of the set of data objects, information for a detailed representation on a dashboard for the selected data object.

4. The method of claim 3, wherein the detailed representation comprises one or more of the following: details of information technology events associated with the selected data object during a selected duration; details of the risk, compliance rules and associated weights associated with the selected data object; or risks of a complete service and risks of components associated with the data object.

5. The method of claim 1, wherein:
the method further comprises providing the user with an opportunity to select one or more of the following criteria:
a specific time duration;
a subset of the set of data objects; a set of systems or users; or
a set of each of these entities related to one or more of the specific time duration, subset of data objects, or the set of systems or users; and
displaying information further comprises displaying to the user of risks and information technology events associated with the selected criteria.

6. The method of claim 1, wherein:
estimating risks comprises:
aggregating at least two of the following risks to an aggregated value for one or more of the selected set of data objects:
risk corresponding to each data object; risk corresponding to each anomalous event;
risk corresponding to each compliance rule; or
risk corresponding to each vulnerability of the system; and
normalizing the aggregated value to a range of values; and
displaying comprises displaying the aggregated value for the one or more of the selected set of data objects.

7. The method of claim 6, further comprising determining each vulnerability of the system using an attack graph for the distributed application.

8. The method of claim 6, wherein each risk is a weight of a corresponding entity.

9. The method of claim 6, wherein a risk used to determine the aggregated risk is determined by multiplication of weights for entities from multiple risks.

10. The method of claim 9, wherein a risk used to determine the aggregated risk is determined by, for a given data object, multiplying a size in bytes of the given data object with a weight of anomalous events associated with that given data object.

11. The method of claim 6, wherein the aggregated value is normalized to a range of values from zero to one hundred.

12. The method of claim 1, wherein estimating risks comprises computing risk based on one or more of the following: a size of a given data object; a weight assigned to the given data object; weights assigned to compliance rules; or weights assigned to anomalous events, wherein weights assigned to anomalous events are assigned with respect to weights of normal events.

13. The method of claim 1, further comprising determining the ranks of the compliance rules as follows:
identifying dependencies between compliance rules;
representing the dependencies as a graph having nodes and edges, wherein each node represents a compliance rule or a group of compliance rules, and wherein each edge is a directed edge from a first node to another node such that the first node is dependent on the other node;

traversing the graph and computing rank of each node using one of a recurrence relation or dynamic programming; and outputting the rank of each node to be used for the displaying.

14. The method of claim 13, wherein computing rank using a recurrence relation comprises using a pagerank algorithm wherein a rank of each node Y depends on the rank of each other node X that has an edge to Y.

15. A computer system comprising one or more memories embodying computer-readable code; and one or more processors, wherein the computer system performs the following in response to execution by the one or more processors of the computer-readable code:

monitoring a distributed application using one or more logs of information technology events in a distributed system comprising the distributed application, wherein the distributed application is an application that is executed on multiple computers simultaneously within the distributed system, and wherein the monitoring comprises collecting information technology events by a plurality of components in the distributed application, wherein the distributed system comprises a plurality of data objects, and the distributed application uses, processes, or otherwise accesses one or more of the plurality of the data objects, and wherein the information technology events concern the distributed application and concern accesses by the distributed application to one or more of the data objects;

correlating the information technology events with a selected set of the plurality of data objects;

estimating risks to the selected set of data objects based on the information technology events, wherein estimating risks uses at least ranks of compliance rules as these rules apply to the data objects in the system and vulnerability scores of components of the distributed application corresponding to the set of data objects and information technology events, wherein the estimated risks include a breach of compliance rules associated with the selected set of data objects, and wherein the compliance rules are defined by one or more regulations;

displaying information allowing a user to determine the estimated risks for the selected set of data objects, wherein the information displayed by the computer system provides the user with an estimated risk of a breach of the regulatory compliance requirements, including user selectable representations of data objects used for data-centric monitoring of compliance applications, and comprising visual indications of the estimated risk for the selected set of data objects, wherein the displayed information allows the user to perform mitigation of the estimated risks for at least one of the selected set of data objects.

16. The method of claim 1, further comprising the user performing mitigation of the estimated risks for at least one of the selected set of data objects.

* * * * *